United States Patent

Nishimoto et al.

[11] Patent Number: 5,999,869
[45] Date of Patent: *Dec. 7, 1999

[54] ELECTRIC POWER STEERING APPARATUS

[75] Inventors: Mitsuhiko Nishimoto, Kashihara; Akio Hayama, Nabari, both of Japan

[73] Assignee: Koyo Seiko Co., Ltd., Osaka, Japan

[ * ] Notice: This patent is subject to a terminal disclaimer.

[21] Appl. No.: 09/010,865

[22] Filed: Jan. 22, 1998

Related U.S. Application Data

[63] Continuation-in-part of application No. 08/542,252, Oct. 12, 1995.

[30] Foreign Application Priority Data

Mar. 4, 1997 [JP] Japan ................................. 9-049060

[51] Int. Cl.$^6$ ........................................................ G06F 7/00
[52] U.S. Cl. ............................ 701/41; 701/42; 180/422; 180/446
[58] Field of Search ........................ 701/41, 42; 180/412, 180/415, 422, 443, 446

[56] References Cited

U.S. PATENT DOCUMENTS

| | | | |
|---|---|---|---|
| 5,720,361 | 2/1998 | Nishimoto et al. | 180/446 |
| 5,752,209 | 5/1998 | Nishimoto et al. | 701/41 |
| 5,835,872 | 11/1998 | Matsuoka et al. | 701/41 |
| 5,878,360 | 3/1999 | Nishino et al. | 701/41 |

*Primary Examiner*—William A. Cuchlinski, Jr.
*Assistant Examiner*—Gertrude Arthur
*Attorney, Agent, or Firm*—Darby & Darby

[57] ABSTRACT

An electric power steering apparatus wherein a motor driving prohibiting means prohibits driving of a motor when a driving logic determining unit determines that a detected torque is outside a specified range, a direction in which the motor is to be driven on the basis of a motor current target value and the direction of the steering torque are opposite with respect to each other, and the direction in which the motor is to be driven on the basis of the motor current target value and the change direction detected by the torque change direction detecting unit are opposite with respect to each other, and when an abnormal current determining unit detects that a driving current is greater than a specified value.

2 Claims, 3 Drawing Sheets

5,999,869

ELECTRIC POWER STEERING APPARATUS

This patent application is a Continuation-in-Part of application Ser. No. 08/542,252 filed Oct. 12, 1995.

BACKGROUND OF THE INVENTION

The present invention relates to an improved electric power steering apparatus in which a steering force assisting motor is driven and controlled on the basis of torque of a steering wheel detected by a torque sensor and driving of the steering force assisting motor to a reverse direction with respect to the direction of the detected torque is prohibited when the detected torque is within a specified range.

FIG. 1 is a block diagram showing an outline structure of a conventional electric power steering apparatus as already proposed in US Patent Application No. 08/542252 (Japanese Patent Application Laid-Open No. 9-11920 (1997)) by the applicant of the present invention. In this electric power steering apparatus, a detected torque signal indicating torque of a steering wheel detected by a torque sensor 1 is sent to a CPU 2. Upon receipt of this detected torque signal, the CPU 2 reads out a target current corresponding to the detected torque signal from an incorporated target current table. By further differentiating the detected torque signal and adding the obtained value to the target current (PD control), a motor current target value (for volume and direction) for a steering force assisting motor 4 is determined.

The CPU 2 drives the motor 4 by controlling a motor driving circuit 3 on the basis of this motor current target value which is made to be a target value for automatic control. At this point, a driving current of the motor 4 detected by a right-direction driving motor current detecting circuit 5a and a left-direction driving motor current detecting circuit 5b is input into the CPU 2 as a feedback value for the automatic control.

The motor current target value is also sent from the CPU 2 to a driving logic determining circuit 9 and a motor non-driving detecting circuit 11 which will be explained later.

The detected torque signal from the torque sensor 1 is also input into a direction prohibitive range determining circuit 8, and this direction prohibitive range determining circuit 8 is preliminarily stored with specified values for both respective directions of the detected torque as shown in FIG. 2 for informing the driving logic determining circuit 9 and a dead zone detecting circuit 10 whether the detected torque is within the range of these specified values.

Further, the detected torque signal from the torque sensor 1 is also sent to a differentiating circuit 20, and the differential value obtained in the differentiating circuit 20 is sent to a torque change direction detecting circuit 21 to detect a changed direction of the detected torque. A signal indicating the changed direction of the detected torque is sent to an abnormal current determining circuit 6 which will be described later and the driving logic determining circuit 9.

A detecting signal from the dead zone detecting circuit 10 for detecting a dead zone of the detected torque in which the motor current target value should be set to zero is sent to the abnormal current determining circuit 6 for determining whether the detected torque is within the dead zone, the motor driving current is greater than a specified value (e.g., 10 A) and that the direction in which the motor is driven on the basis of the motor driving current and the changed direction of the detected torque are opposite with respect to each other. At this point, the specified value for the motor driving current is set to be greater than a maximum value of a current for returning the steering wheel and, simultaneously, to be a value at which the electric power steering apparatus is not in an unstable condition.

The driving logic determining circuit 9 determines whether the detected torque is outside the dead zone, the direction in which the motor is to be driven on the basis of the motor current target value and the direction of the detected torque are opposite with respect to each other, and the direction in which the motor is to be driven on the basis of the motor current target value and the changed direction of the detected torque are opposite with respect to each other. Each of the results obtained in the driving logic determining circuit 9 and the abnormal current determining circuit 6 is sent to a driving abnormality detecting circuit 7 and when the driving abnormality detecting circuit 7 detects abnormalities in the obtained results, a detecting timer 12 and a deciding timer 15 are started to time their respective set times T1 (e.g. 10 msec) and T2 (e.g. 1 sec).

When the detecting timer 12 completes counting time T1, a latch circuit 13 holds an abnormality detected signal from the driving abnormality detecting circuit 7. While the latch circuit 13 holds the abnormality detected signal from the driving abnormality detecting circuit 7, a diagnosis lamp 19 is switched ON and a motor driving prohibiting circuit 14 stops the operation of the motor driving circuit 3.

The latch circuit 13 is cleared when the motor non-driving detecting circuit 11 for detecting that the motor current target value is zero detects a zero value.

When the deciding timer 15 completes counting time T2, a latch circuit 16 holds the abnormality detected signal from the driving abnormality detecting circuit 7. While the latch circuit 16 holds the abnormality detected signal from the driving abnormality detecting circuit 7, the diagnosis lamp 19 is switched ON and a fail-safe relay 18 for connecting the motor driving circuit 3 and a power source is turned OFF by a relay driving prohibiting circuit 17.

The operation of the electric power steering apparatus of the above-described structure will be now explained.

The detected torque detected by the torque sensor 1 is input into the direction prohibitive range determining circuit 8 whereupon the direction prohibitive range determining circuit 8 determines the direction and volume of the detected torque to send a signal indicating the direction of the detected torque to the driving logic determining circuit 9. As for the volume of the detected torque, an informing signal concerning whether the detected torque is greater or smaller than the specified value (whether they are within or outside the dead zone) in the respective leftward and rightward directions is sent to the dead zone detecting circuit 10 as shown in FIG. 2. From the dead zone detecting circuit 10, an informing signal concerning whether the detected torque is within or outside the dead zone is sent to the abnormal current determining circuit 6.

The detected torque detected by the torque sensor 1 is also input into the differentiating circuit 20 and the calculated value obtained in the differentiating circuit 20 is sent to the torque change direction detecting circuit 21 to detect the changed direction of the detected torque. A signal indicating the changed direction of the detected torque is sent to the abnormal current determining circuit 6 and the driving logic determining circuit 9.

At this point, the driving logic determining circuit 9 informs the driving abnormality detecting circuit 7 of abnormalities during a period in which the detected torque is outside the dead zone, the direction in which the motor is to be driven on the basis of the motor current target value and the direction of the detected torque are opposite with respect to each other, and the direction in which the motor is to be driven on the basis of the motor current target value and the changed direction of the detected torque are opposite with respect to each other.

Further, the abnormal current determining circuit 6 informs the driving abnormality detecting circuit 7 of abnormalities during a period in which the detected torque is within the dead zone, the motor driving current is greater than the specified value, and the direction in which the motor is driven on the basis of the motor driving current and the changed direction of the detected torque are opposite with respect to each other.

Upon receipt of abnormality information from the driving logic determining circuit 9 or the abnormal current determining circuit 6, the driving abnormality detecting circuit 7 detects the abnormality and actuates the detecting timer 12 and the deciding timer 15. When the abnormality information from the driving logic determining circuit 9 or the abnormal current determining circuit 6 is interrupted, the detecting timer 12 and the deciding timer 15 are reset by the driving abnormality detecting circuit 7.

When the detecting timer 12 completes counting of time T1 in the absence of interruptions of abnormality information sent from the driving logic determining circuit 9 or the abnormal current determining circuit 6 to the driving abnormality detecting circuit 7, it allows the latch circuit 13 to hold the abnormality information sent from the driving logic determining circuit 9 or the abnormal current determining circuit 6. While the latch circuit 13 holds the abnormality information, the diagnosis lamp 19 is switched ON and the motor driving prohibiting circuit 14 is actuated to prohibit driving of the motor 4. During this period, when the motor non-driving detecting circuit 11 detects that the motor current target value is zero, the latch circuit 13 is cleared and the actuation of the motor driving prohibiting circuit 14 is terminated to release the driving prohibiting condition of the motor 4.

When the deciding timer 15 completes counting of time T2 in the absence of interruptions of abnormality information sent from the driving logic determining circuit 9 or the abnormal current determining circuit 6 to the driving abnormality detecting circuit 7, it allows the latch circuit 16 to hold the abnormality information sent from the driving logic determining circuit 9 or the abnormal current determining circuit 6. While the latch circuit 16 holds the abnormality information, the diagnosis lamp 19 is switched ON, the relay driving prohibiting circuit 17 is actuated, the fail safe relay 18 is turned OFF, and the power source of the motor driving circuit 3 is turned OFF. The latch circuit 16 is cleared when the power source of the electric power steering apparatus is turned OFF (the ignition key is turned OFF).

Since the latch circuit 13 is reset upon non-driving detection of the motor by the CPU 2, it may be possible that in a runaway condition of the CPU 2 it may become unstable by repeating detecting and returning. Thus, time T2 of the deciding timer 15 is set to be sufficiently longer than time T1 of the detecting timer 12, and in case driving abnormalities should continue during this time T2, occurrence of breakdown is confirmed.

The electric power steering apparatus determines an assist current and steering wheel returning current based on torque signals in the CPU 2 and performs differential control of the detected torque signal (angular speed differential control). In this case, when a large gain is set for the differential control, driving abnormalities may be detected although the CPU 2 is in good order (not in a runaway condition) when a high-flow of the motor driving momentarily occurs even though the direction in which the motor 4 is to be driven on the basis of the motor current target value and the direction of the detected torque are opposite with respect to each other and the detected torque is within the dead zone.

Therefore, the set time Ti for the detecting timer 12 needs to be longer than a time in which the driving abnormality detecting circuit 7 operates in a normal condition; however, it presented a drawback in that a runaway of the CPU 2 may be tolerated during this period when the time is set to be too long, and it could not function as a means for ensuring safety in runaway conditions.

Accordingly, the above-described electric power steering apparatus is provided to comprise the differentiating circuit 20 and the torque change direction detecting circuit 21, wherein an additional condition that the direction in which the motor 4 is driven on the basis of the motor driving current and the changed direction of the detected torque are opposite with respect to each other is included for determining driving abnormalities, and the time T1 is set to be as short as possible. However, this structure cannot cope with the problem in that, when a momentary condition occurs in which the direction in which the motor 4 is to be driven on the basis of the motor driving current target value and the direction of the detected torque are opposite with respect to each other although the CPU 2 is in good order, and the time representing this moment exceeded the short time T1, driving abnormalities (runaway of CPU) is detected.

BRIEF SUMMARY OF THE INVENTION

The present invention has been devised to solve the above problems. A purpose of the present invention is to provide an electric power steering apparatus which is able to detect runaway of a CPU in a short time without errors.

The electric power steering apparatus according to the present invention is characterized in that a motor driving prohibiting means prohibits driving of a motor when a driving logic determining unit determines that a detected torque is outside a specified range, a direction in which the motor is to be driven on the basis of a motor current target value and a direction of the detected torque are opposite with respect to each other, and the direction in which the motor is to be driven on the basis of the motor current target value and a change direction detected by a torque change direction detecting unit are opposite with respect to each other, and when an abnormal current determining unit determines that a driving current is greater than a specified value.

Therefore, when a condition momentarily occurs in which the direction in which the motor is to be driven on the basis of the motor current target value and the direction of the detected torque are opposite with respect to each other although the CPU is in good order, the driving current of the motor is small so that the runaway of the CPU can be detected in a short time without errors by adding a state that the driving current of the motor is greater than a specified value to a condition for determining abnormalities.

Moreover, the apparatus is characterized in that the motor driving prohibiting means comprises a first timer which starts timing when the driving logic determining unit determines that the above conditions are satisfied and which is reset when the driving logic determining unit determines that the conditions are not satisfied, and a second timer which starts timing when the driving logic determining unit determines that the conditions are satisfied and when the abnormal current determining unit determines that the driving current is greater than the specified value, and which is reset when the driving logic determining unit determines that the conditions are not satisfied or when the abnormal current determining unit does no longer determine that the driving current is greater than the specified value, wherein driving of the motor is prohibited when the first timer completes counting for its set time or when the second timer completes counting for its set time which is shorter than the set time for the first timer.

When a condition momentarily occurs in which the direction in which the motor is to be driven on the basis of the motor current target value and the direction of the detected torque are opposite with respect to each other although the CPU is in good order, the driving current of the motor is small. Therefore, when the detecting time (the set time for the first timer) is made long, it is possible to avoid erroneous detection in the above case. Also, when the driving current of the motor is small, the influence of an actual runaway of the CPU is small so that the detecting time may be made long.

The above and further objects and features of the invention will more fully be apparent from the following detailed description with accompanying drawings.

DETAILED DESCRIPTION OF THE INVENTION

The present invention will now be explained in details with reference to the drawings which show an embodiment thereof.

Figure 3:
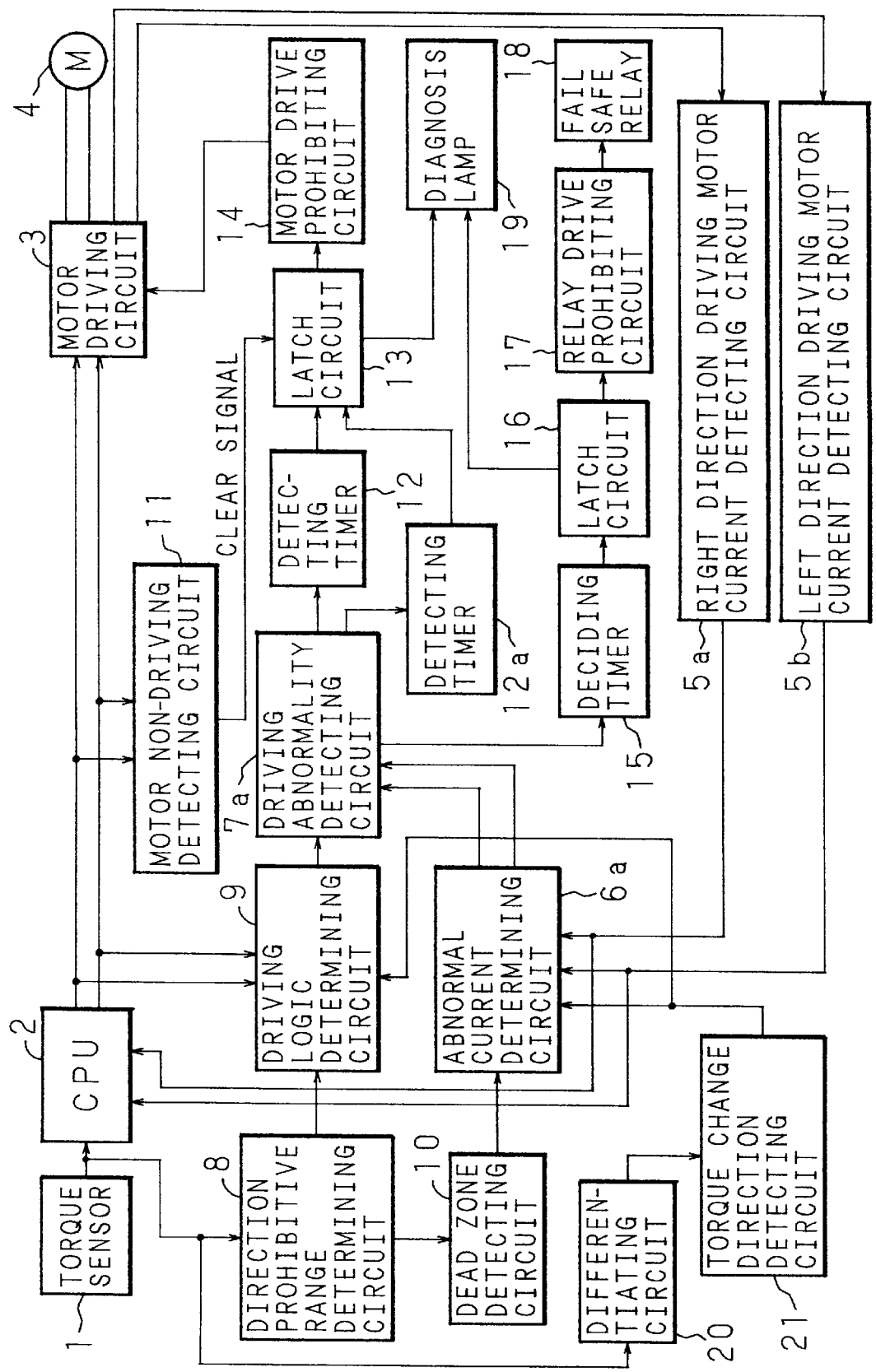
FIG. 3 is a block diagram showing an outline structure of an electric power steering apparatus according to the present invention.

FIG. 3 is a block diagram showing an outline structure of an electric power steering apparatus according to the present invention. In this electric power steering apparatus, a detected torque signal indicating torque of a steering wheel detected by a torque sensor 1 is sent to a CPU 2. Upon receipt of this detected torque signal, the CPU 2 reads out a target current corresponding to the detected torque signal from an incorporated target current table. By further differentiating the detected torque signal and adding the obtained value to the target current (PD control), a motor current target value (for volume and direction) for a steering force assisting motor 4 is determined.

The CPU 2 drives the motor 4 by controlling a motor driving circuit 3 on the basis of this motor current target value which is made to be a target value for automatic control. At this point, a driving current of the motor 4 detected by a right-direction driving motor current detecting circuit 5a and left-direction driving motor current detecting circuit 5b is input into the CPU 2 as a feedback value for the automatic control.

The motor current target value is also sent from the CPU 2 to a driving logic determining circuit 9 and a motor non-driving detecting circuit 11 which will be explained later.

Figure 1:
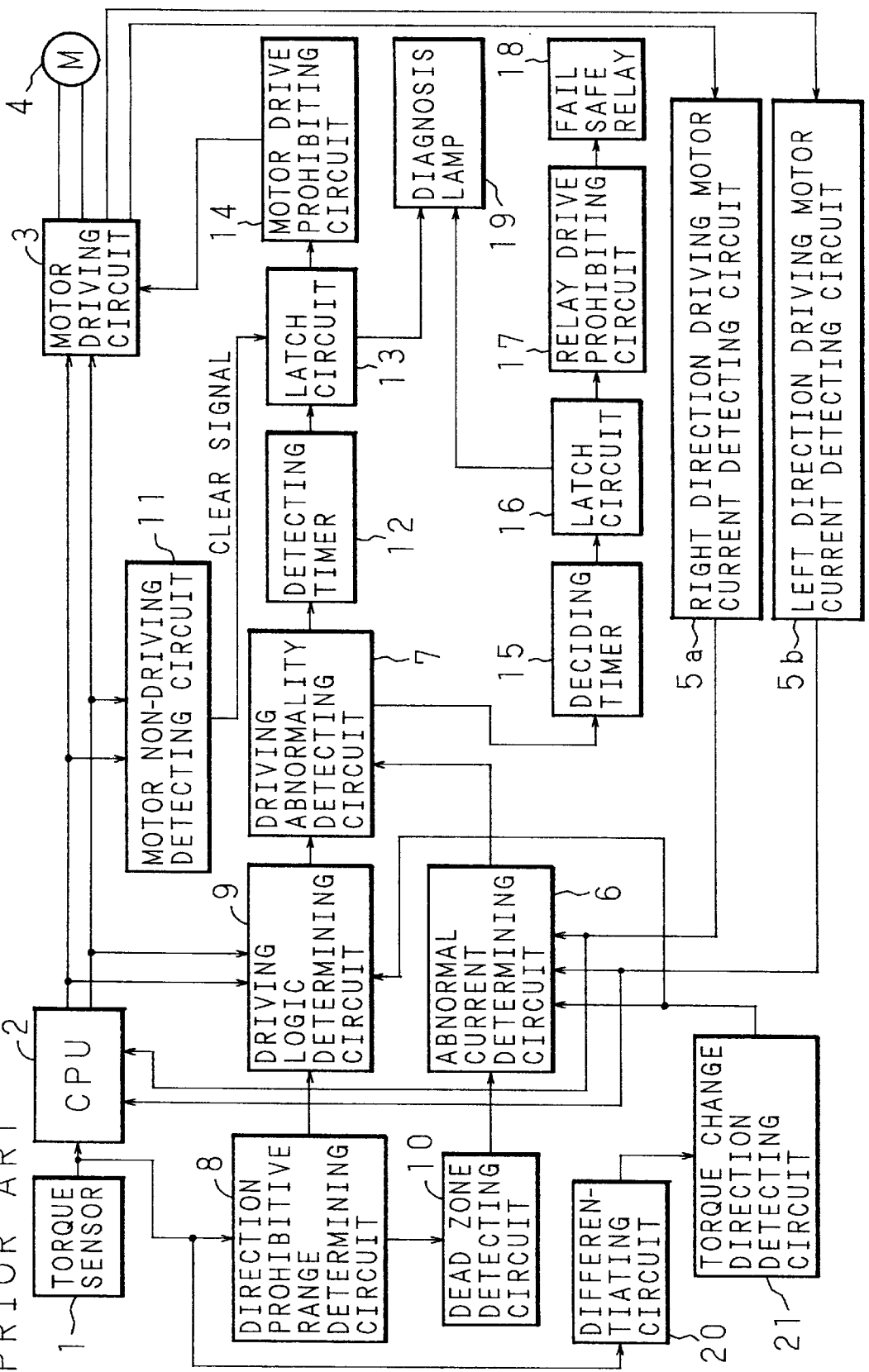
FIG. 1 is a block diagram showing an outline structure of a conventional electric power steering apparatus.
Figure 2:
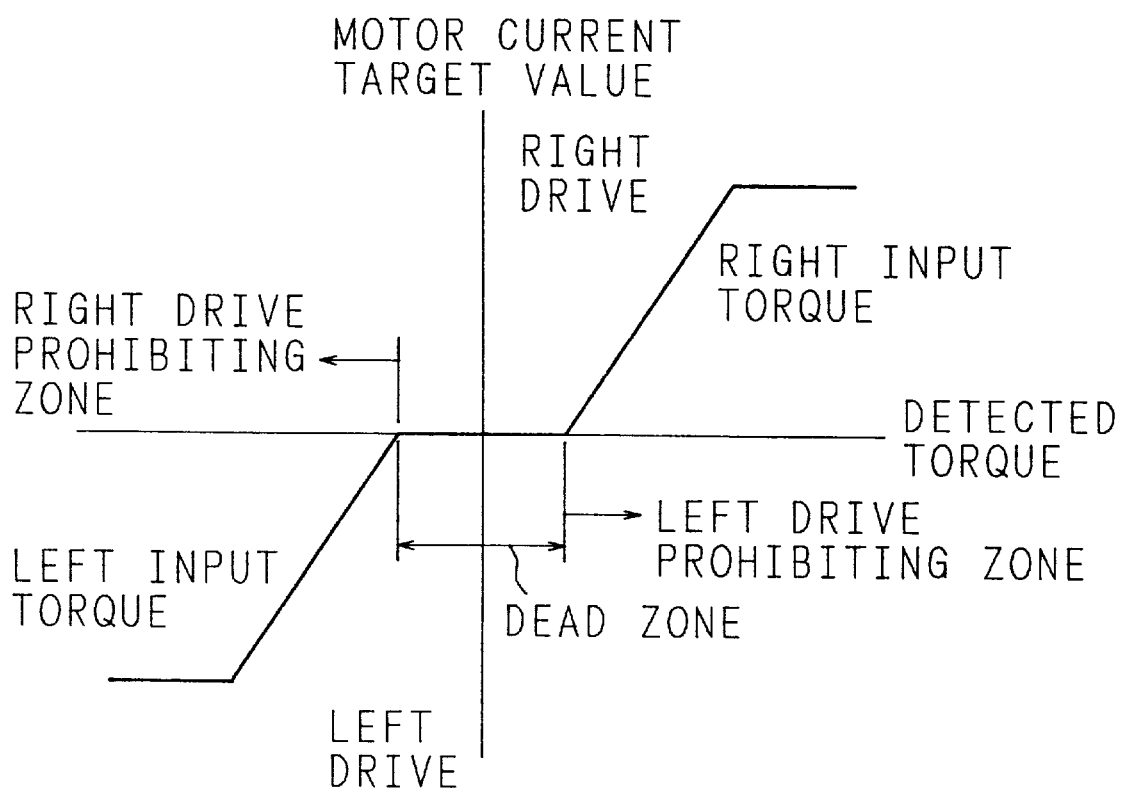
FIG. 2 is an explanatory diagram for explaining a relationship between a detected torque and a motor current target value in the electric power steering apparatus.

The detected torque signal from the torque sensor 1 is also input into a direction prohibitive range determining circuit 8, and this direction prohibitive range determining circuit 8 is preliminarily stored with specified values for both respective directions of the detected torque as shown in FIG. 2 for informing the driving logic determining circuit 9 and a dead zone detecting circuit 10 whether the detected torque is within the range of these specified values.

Further, the detected torque signal from the torque sensor 1 is also sent to a differentiating circuit 20, and the differential value obtained in the differentiating circuit 20 is sent to a torque change direction detecting circuit 21 to detect a changed direction of the detected torque. A signal indicating the changed direction of the detected torque is sent to an abnormal current determining circuit 6a which will be described later and the driving logic determining circuit 9.

A detecting signal from the dead zone detecting circuit 10 for detecting a dead zone (specified range) of the detected torque in which the motor current target value should be set to zero is sent to the abnormal current determining circuit 6a for determining whether the driving current of the motor is greater than a specified value (e.g. 10 A) and that the detected torque is within the dead zone, the driving current of the motor is greater than a specified value (e.g. 10 A) and that the direction in which the motor is driven on the basis of the motor driving current and the changed direction of the detected torque are opposite with respect to each other. At this point, the specified value for the motor driving current is set to be greater than a maximum value for a returning current of the steering wheel and, simultaneously, to be a value at which the electric power steering apparatus is not in an unstable condition.

The driving logic determining circuit 9 determines whether the detected torque is outside the dead zone, the direction in which the motor is to be driven on the basis of the motor current target value and the direction of the detected torque are opposite with respect to each other, and the direction in which the motor is to be driven on the basis of the motor current target value and the changed direction of the detected torque are opposite with respect to each other. Each of the results obtained in the driving logic determining circuit 9 and the abnormal current determining circuit 6a is sent to a driving abnormality detecting circuit 7a.

The driving abnormality detecting circuit 7a makes a detecting timer 12a and a deciding timer 15 start to count their respective set times T3 (e.g. 30 msec) and T2 (e.g. 1 sec) when the determined results indicate that the detected torque is outside the dead zone, the direction in which the motor is to be driven on the basis of the motor current target value and the direction of the detected torque are opposite with respect to each other, and the direction in which the motor is to be driven on the basis of the motor current target value and the changed direction of the detected torque are opposite with respect to each other. When the detecting timer 12a completes counting the set time T3, a latch circuit 13 holds an abnormality detected signal from the driving abnormality detecting circuit 7a.

Further, the driving abnormality detecting circuit 7a allows a detecting timer 12 and the deciding timer 15 to start counting their set times T1 (e.g. 10 msec) and T2 (e.g. 1 sec) when the determined results indicate that the detected torque is outside the dead zone, the direction in which the motor is to be driven on the basis of the motor current target value and the direction of the detected torque are opposite with be driven on the basis of the motor current target value and the changed direction of the detected torque are opposite with respect to each other, and the driving current of the motor is greater than a specified value (e.g. 10 A).

Further, the driving abnormality detecting circuit 7a makes the determining timer 12 and the deciding timer 15 start counting their set times T1 (e.g. 10 msec) and T2 (e.g. 1 sec) when the determined results indicate that the detected torque is within the dead zone, the driving current of the motor is greater than the specified value (e.g. 10 A), and the direction in which the motor is driven on the basis of the motor driving current and the changed direction of the detected torque are opposite with respect to each other.

When the detecting timer 12 completes counting of the time T1, the latch circuit 13 holds the abnormality detected signal from the driving abnormality detecting circuit 7a.

While the latch circuit 13 holds the abnormality detected signal from the driving abnormality detecting circuit 7a, a diagnosis lamp 19 is switched ON and a motor driving prohibiting circuit 14 stops the operation of the motor driving circuit 3.

The latch circuit 13 is cleared when the motor non-driving detecting circuit 11 for detecting that the motor current target value is zero is detected a zero value.

When the deciding timer 15 completes counting of the time T2, a latch circuit 16 holds the abnormality detected signal from the driving abnormality detecting circuit 7a. While the latch circuit 16 holds the abnormality detected signal from the driving abnormality detecting circuit 7a, the diagnosis lamp 19 is switched ON and a fail safe relay 18 for connecting the motor driving circuit 3 and a power source is turned OFF by a relay driving prohibiting circuit 17.

The operation of the electric power steering apparatus of the above-described structure will be now explained.

The torque of the steering wheel detected by the torque sensor 1 is input into the direction prohibitive range determining circuit 8 whereupon the direction prohibitive range determining circuit 8 determines the direction and volume of the detected torque to send a signal indicating the direction of the detected torque to the driving logic determining circuit 9. An informing signal concerning whether the volume of the detected torque is greater or smaller than the specified value (whether they are within or outside the dead zone) in the respective leftward and rightward directions is sent to the dead zone detecting circuit 10 as shown in FIG. 2. From the dead zone detecting circuit 10, an informing signal concerning whether the detected torque is within or outside the dead zone is sent to the abnormal current determining circuit 6a.

The torque detected by the torque sensor 1 is also input into the differentiating circuit 20 and the calculated value obtained in the differentiating circuit 20 is sent to the torque change direction detecting circuit 21 to detect the changed direction of the detected torque. A signal indicating the changed direction of the detected torque is sent to the abnormal current determining circuit 6a and the driving logic determining circuit 9.

At this point, the driving logic determining circuit 9 informs the driving abnormality detecting circuit 7a of abnormalities during a period in which the detected torque is outside the dead zone, the direction in which the motor is to be driven on the basis of the motor current target value and the direction of the detected torque are opposite with respect to each other, and the direction in which the motor is to be driven on the basis of the motor current target value and the changed direction of the detected torque are opposite with respect to each other.

Further, the abnormal current determining circuit 6a informs the driving abnormality detecting circuit 7a of abnormalities during a period in which the motor driving current is greater than the specified value and during a period in which the detected torque is within the dead zone, the motor driving current is greater than the specified value, and the direction in which the motor is driven on the basis of the motor driving current and the changed direction of the detected torque are opposite with respect to each other.

The driving abnormality detecting circuit 7a makes the detecting timer 12a and a deciding timer 15 start to count their respective set times T3 (e.g. 30 msec) and T2 (e.g. 1 see) when these abnormalities indicate that the detected torque is outside the dead zone, the direction in which the motor is to be driven on the basis of the motor current target value and the direction of the detected torque are opposite with respect to each other, and the direction in which the motor is to be driven on the basis of the motor current target value and the changed direction of the detected torque are opposite with respect to each other. When information of these abnormalities is interrupted, the detecting timer 12a and deciding timer 15 are reset.

When the detecting timer 12a completes counting of the set time T3 without the abnormality information being interrupted, it allows the latch circuit 13 to hold the abnormality detecting signal from the driving abnormality detecting circuit 7a.

Further, the driving abnormality detecting circuit 7a makes the detecting timer 12 and the deciding timer 15 start counting of their respective set times T1 (e.g. 10 msec) and T2 (e.g. 1 sec) when these abnormalities indicate that indicate that the detected torque is outside the dead zone, the direction in which the motor is to be driven on the basis of the motor current target value and the direction of the detected torque are opposite with respect to each other, the direction in which the motor is to be driven on the basis of the motor current target value and the changed direction of the detected torque are opposite with respect to each other, and the driving current of the motor is greater than the specified value (e.g. 10 A). When information of these abnormalities is interrupted, the detecting timer 12 and deciding timer 15 are reset.

Further, the driving abnormality detecting circuit 7a makes the detecting timer 12 and the deciding timer 15 start counting of their respective set times T1 (e.g. 10 msec) and T2 (e.g. 1 sec) when these abnormalities indicate that the detected torque is within the dead zone, the driving current of the motor is greater than the specified value (e.g. 10 A), and the direction in which the motor is driven on the basis of the motor driving current and the changed direction of the detected torque are opposite with respect to each other. When information of these abnormalities is interrupted, the detecting timer 12 and deciding timer 15 are reset.

When the detecting timer 12 completes counting of the set time T1 without the abnormality information being interrupted, it allows the latch circuit 13 to hold the abnormality detecting signal from the driving abnormality detecting circuit 7a.

While the latch circuit 13 holds abnormality information, the diagnosis lamp 19 is switched ON, the motor driving prohibiting circuit 14 is actuated to prohibit driving of the motor 4. During this period, the latch circuit 13 is cleared when the motor non-driving detecting circuit 11 detects that the motor current target value is zero, whereby the operation of the motor driving prohibiting circuit 14 is terminated and the driving prohibiting condition of the motor 4 is released.

When the deciding timer 15 completes counting of the time T2 in the absence of interruptions of abnormality information sent from the driving abnormality detecting circuit 7a, it allows the latch circuit 16 to hold the abnormality information sent from the driving logic determining circuit 9 or the abnormal current determining circuit 6a. While the latch circuit 16 holds the abnormality information, the diagnosis lamp 19 is switched ON, the relay driving prohibiting circuit 17 is actuated, the fail-safe relay 18 is turned OFF, and the power source of the motor driving circuit 3 is turned OFF. The latch circuit 16 is cleared when the power source of the electric power steering apparatus is turned OFF (the ignition key is turned OFF).

At this point, when the latch circuit 13 is not made not to be cleared unless the motor non-driving detecting circuit 11 detects that the motor current target value is zero (non-driving), the following inconveniences occur.

When the CPU 2 is in a runaway condition, and the motor current target value is an excessive value, a high-current is sent to the motor 4 and the steering wheel rotates during the detecting timer 12 counts the set time T1 even if the detected torque is within the dead zone.

By the rotation of the steering wheel, a detected torque is generated in a direction opposite to the direction of the motor driving current so that the driving logic determining circuit 9 determines abnormality and informs accordingly. Therefore, the motor 4 is prohibited from driving, is made assist off, and the steering wheel is returned in the reverse direction. At this time, the conditions determined by the driving logic determining circuit 9 becomes in good order so that high-current is again sent to the motor. The same operation is repeated thereafter, and the operation of the electric power steering apparatus becomes unstable.

When the deciding timer 15 completes counting of the time T2 in the absence of interruptions of abnormality information sent from the driving abnormality detecting circuit 7a, it allows the latch circuit 16 to hold the abnormality information sent from the driving abnormality detecting circuit 7a. While the latch circuit 16 holds the abnormality information, the diagnosis lamp 19 is switched ON, the relay driving prohibiting circuit 17 is actuated, the fail-safe relay 18 is turned OFF, and the power source of the motor driving circuit 3 turned OFF. The latch circuit 16 is cleared when the power source of the electric power steering apparatus is turned OFF (the ignition key is turned OFF).

Since the latch circuit 13 is reset upon non-driving detection of the motor by the CPU 2, it may be possible that in a runaway condition of the CPU 2 it may become unstable by repeating detecting and returning. Thus, the time T2 of the deciding timer 15 is set to be sufficiently longer than the times T1, T3 of the detecting timers 12, 12a and in case driving abnormalities should continue during this time T2, occurrence of breakdown is confirmed.

During the period in which the logic is not realized in which the detected torque is outside the dead zone, the direction in which the motor 4 is to be driven on the basis of the motor current target value and the direction of the detected torque are opposite with respect to each other, and the direction in which the motor 4 is to be driven on the basis of the motor current target value and the changed direction of the detected torque are opposite with respect to each other, the driving logic determining circuit 9 does not detect abnormal conditions and no abnormality is informed to the driving abnormality detecting circuit 7a.

Also, during the period in which the motor driving current is smaller than the specified value and during a period in which the condition is not met in which the detected torque is within the dead zone, the motor driving current is greater than the specified value, and the direction in which the motor 4 is driven on the basis of the motor driving current and the changed direction of the detected torque are opposite with respect to each other, the abnormal current determining circuit 6a does not inform the driving abnormality detecting circuit 7a of abnormality.

When no abnormality is informed by the driving logic determining circuit 9 or the abnormal current determining circuit 6a, the driving abnormality detecting circuit 7a stops the detecting timers 12, 12a and the deciding timer 15. Thus, the latch circuits 13, 16 do not hold the abnormal information signals and the motor driving prohibiting circuit 14 and the relay driving prohibiting circuit 17 are not actuated.

According to the system of the present invention, when a condition momentarily occurs in which the direction in which the motor is to be driven on the basis of the motor current target value and the direction of the detected torque are opposite with respect to each other although the CPU is in good order, the driving current of the motor is small, thus the runaway of the CPU can be detected in a short time without errors by including a condition that the driving current of the motor is greater than a specified value for determining abnormalities.

Further, when the motor driving current is smaller than the specified value, the detecting time may be made long in order to avoid erroneous detection in the above condition. Also, when the driving current of the motor is small, the influence of an actual runaway of the CPU is small so that the detecting time may be made long.

On the other hand, by additionally including a condition that the motor driving current should be greater than the specified value when performing detection, the above-explained momentary situation is not erroneously detected as a runaway of the CPU so that the runaway of the CPU can be detected in a short time without errors.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An electric power steering apparatus, comprising:
   a steering force assisting motor;
   a torque sensor for detecting a steering torque and a direction thereof;
   a means for judging whether a value of the torque detected by the torque sensor is outside a specified range with respect-to each direction;
   a means for setting a motor current target value based on the detected torque when the detected torque is outside the specified range;
   a motor driving circuit for driving the motor on the basis of the set motor current target value;

a driving current detecting circuit for detecting a driving current for the motor;

an abnormal current determining unit for determining whether the driving current is greater than a specified value;

a torque change direction detecting unit for detecting a change direction of the steering torque on the basis of the results detected by the torque sensor;

a driving logic determining unit for determining a driving logic on the basis of the motor current target value, the detected direction and value of the torque and the change direction detected by the torque change direction detecting unit; and a motor driving prohibiting means for prohibiting the motor from driving on the basis of the results determined by the driving logic determining unit, wherein the motor driving prohibiting means prohibits driving of the motor when the driving logic determining unit determines that the detected torque is outside the specified range, the direction in which the motor is to be driven on the basis of the motor current target value and the direction of the detected torque are opposite with respect to each other, and the direction in which the motor is to be driven on the basis of the motor current target value and the change direction detected by the torque change direction detecting unit are opposite with respect to each other, and when the abnormal current determining unit determines that the driving current detected by the driving current detecting circuit is greater than the specified value.

2. The electric power steering apparatus according to claim 1, therein the motor driving prohibiting means includes:

a first timer which starts timing when the driving logic determining unit determines that said conditions are satisfied and which is reset when the driving logic determining unit determines that said condition is not satisfied;

a second timer which starts timing when the driving logic determining unit determines that said conditions are satisfied and when the abnormal current determining unit determines that the driving current is greater than the specified value, and which is reset when the driving logic determining unit determines that said conditions are not satisfied or when the abnormal current determining unit does no longer determine that the driving current is greater than the specified value; and a circuit for prohibiting driving of the motor when the first timer completes counting for a first set time or when the second timer completes counting for a second set time, wherein the second set time for the second timer is shorter than the first set time for the first timer.

* * * * *